March 1, 1938.  W. O. THEWES  2,110,099

THREADING DIE

Original Filed Jan. 2, 1935  2 Sheets-Sheet 1

Inventor
WILLIAM O. THEWES

By Richey & Watts
Attorneys

March 1, 1938. W. O. THEWES 2,110,099
THREADING DIE
Original Filed Jan. 2, 1935 2 Sheets-Sheet 2
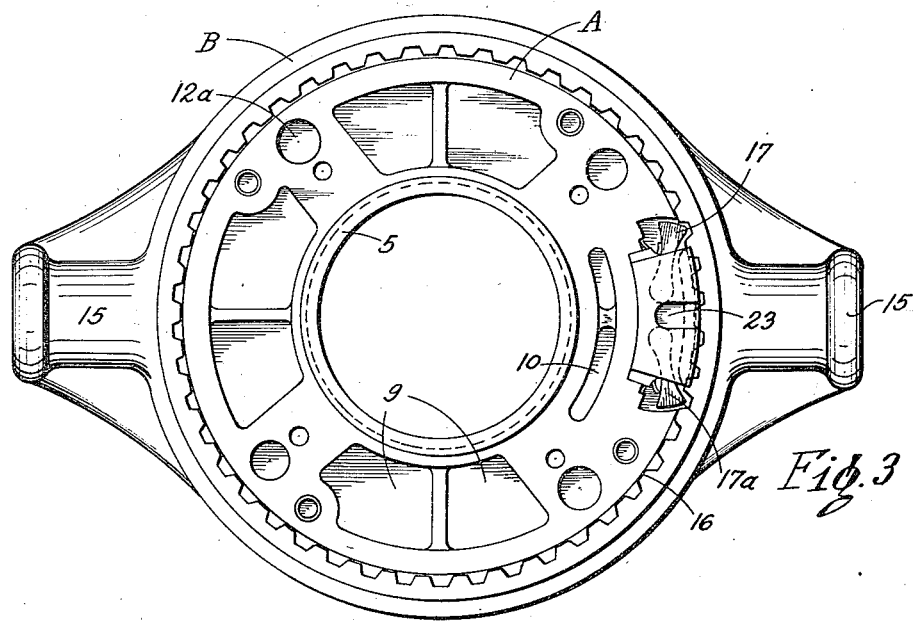
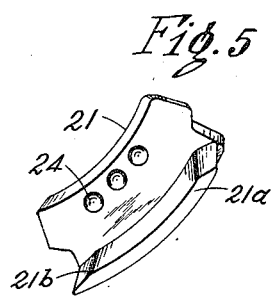
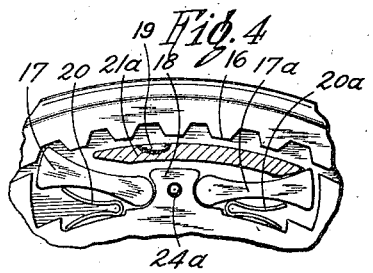
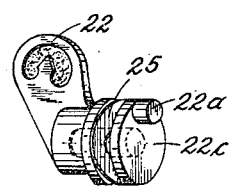
Inventor
WILLIAM O. THEWES
By Richey & Watts
Attorneys Patented Mar. 1, 1938

2,110,099

UNITED STATES PATENT OFFICE 2,110,099

THREADING DIE

William O. Thewes, North Ridgeville, Ohio, assignor to The Ridge Tool Company, Ridgeville, Ohio, a corporation of Ohio Original application January 2, 1935, Serial No. 4, now Patent No. 2,076,831. Divided and this application November 4, 1935, Serial No. 48,114

1 Claim. (Cl. 10—124)

This invention relates to pipe threading tools or die stocks.

The primary object of the invention is to provide, in tools of this class, an improved type of ratchet mechanism whereby the tool or die stock may be easily and quickly changed over from a ratchet type die stock to a solid type die stock, or one wherein the ratchet mechanism is released and the threading operation carried on by turning the die stock continuously in one direction. In such instances, the work is ofttimes heavy and requires considerable leverage to effect the threading operation. Another advantage of the present tool is that the ratchet mechanism is so constructed as to be capable of withstanding relatively great thrust, while at the same time being capable of quick and easy operation or adjustment.

This application is a division of my copending application Serial No. 4, filed January 2, 1935.

The foregoing and other objects and advantages will become apparent from the following description taken in conjunction with the drawings, wherein:

Figure 3 is an elevational view of the chaser-carrier or housing and ratchet or drive ring in assembled relation together with the ratchet mechanism;

Figure 4 is an enlarged fragmentary view of the ratchet mechanism and adjacent parts;

Figures 5 and 6 are detail perspective views of a pawl cam and cam lever.

The improved tool comprises a chaser carrier plate or housing generally indicated at A, a drive ratchet ring generally indicated at B, a workholder generally indicated at C, a cam post plate D, and a backing plate E. Since the present invention is concerned primarily with the ratchet mechanism, the remaining parts of the tool need only be described sufficiently to bring out the operation of the tool.

Figure 2:
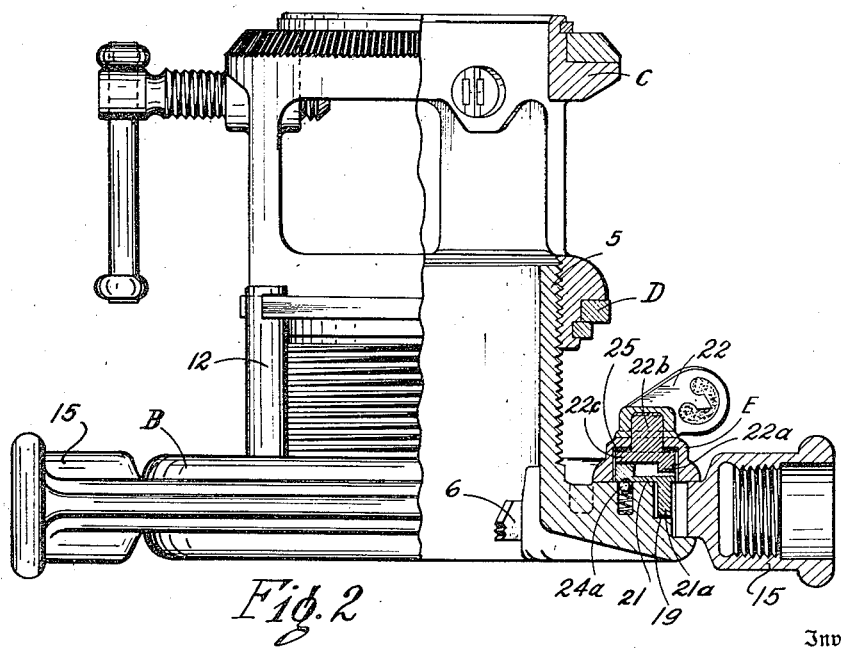
Figure 2 is a view in section and side elevation, the part in section being taken along the line 2—2, Figure 1.

The chaser carrier or housing is preferably made of die cast material, or is a die casting, the preferred construction of this part of the assembly being best shown in Figure 3. The central portion of the housing is shown with a threaded barrel 5 on which the workholder C is adapted to be threaded. The chasers, one of which is shown at 6 in Figure 2, are mounted in a plurality of radial slots formed in the carrier housing. The cut-out portions indicated at 9 and 10 are simply formed in the housing A to lighten the casting without detracting from its strength. The chasers are preferably resiliently held in position by means of resiliently mounted detent members, not here shown, since they form no part of the present invention. The cutters are permitted a certain amount of retraction or backing-off movement during the threading operation in order to provide a certain amount of taper on the threaded pipe end, cam posts 12 being provided and at their lower extremities project through registering holes 12a formed in the backing plate E and chaser carrier plate A.

The drive or ratchet ring B is provided with handle sockets 15 and a plurality of internal teeth 16. The ratchet mechanism consists of a pair of oppositely disposed pawls or dogs 17 and 17a, which have their inner extremities disposed against an abutment 18 (note Figure 4) which is preferably formed integrally with the chaser carrier A. At the lower or outer extremity of the abutment 18, a pawl retaining boss or member 19 is provided and is also formed integrally with the said carrier. Springs 20 and 20a normally urge the pawls 17 and 17a outwardly into engagement with the teeth of the drive ring B. A pawl cam 21, shown more or less in detail in Figure 5, is provided and is formed with a cam portion or toe 21a which rides on the boss 19 and at its opposite side edges is formed with cam surfaces 21b adapted to engage the pawls 17 and 17a and move the latter clear of the teeth 16 when the cam member 21 is moved in an arcuate path by means of the lever 22, note Figure 6. Lever 22 is provided with an eccentrically disposed pin 22a adapted to engage in a slot 23 formed in the cam member 21, note Figure 3. The cam member 21 is formed with a plurality of detent notches or recesses 24 adapted to engage a detent or spring-pressed ball 24a disposed in the abutment 18. The lever 22 is secured on a pin 22b which is journaled in the backing plate E and is provided with a cam disc 22c which in turn carries pin 22a. To hold the thumb lever under tension, a bent spring washer 25 is arranged to bear against the disc 22b.

Figure 1:
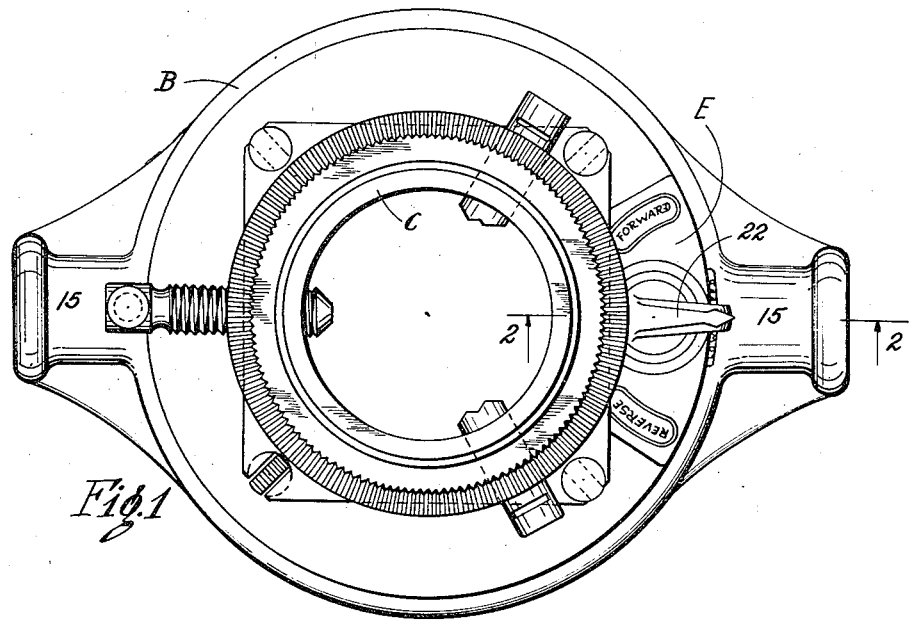
Figure 1 is a view in end elevation of a thread cutting tool or die stock embodying the features of the invention, one of the chaser cam posts being shown in section.

In operation, assuming it is desired to rotate the cutter or die stock in a thread-cutting direction, the thumb lever 22 may be turned to the right in Figure 1, thereby sliding the cam member 21 against the pawl 17 and moving it clear of the ratchet teeth 16 while the pawl 17a remains in driving engagement with said teeth. To run the cutter or die stock in a reverse direction or to back it off of the cut threads, the lever may be turned in the opposite direction, thereby reversing the position of the pawls, note the position of the parts in Figure 4. Assuming it is desired to use the die as a solid die for work over a certain size, then the cam member 21 may be adjusted to intermediate position at which point both the dogs 17 and 17a engage the ratchet teeth 16 and lock the drive ring with the chaser housing. Two handle sockets 15 are preferably provided so that two men may work the same tool, or one man may use both hands to the best advantage.

It will be noted that the pawls 17, 17a are so constructed and arranged that they will transmit the driving thrust in a substantially straight line to the abutment 18, said pawls projecting at a tangent and having their faces lying in substantially the same plane as the teeth of the drive ring. This construction will stand relatively great thrust.

The parts of the ratchet mechanism are simple in construction and may be easily and quickly replaced in the event of breakage.

It will be understood that certain variations in structure and design may be adopted within the scope of the invention as defined by the appended claim.

I claim:

In a thread cutting tool, a chaser-carrier plate, an internally toothed drive ring mounted around said plate, said plate being provided with a pawl housing, an abutment in said housing, a pair of spring-pressed pawls mounted in opposed relation in said housing and projecting tangentially into releasable engagement with the teeth of the drive ring, the inner ends of said pawls bearing against said abutment, a cam member disposed over said pawls and having cammed edges adapted to engage the pawls, a manually-operable lever operatively connected to said cam member whereby the latter may be moved in opposite directions to reverse positions or to an intermediate neutral position, said cam member when moved in opposite directions selectively interposing said member between said pawls and the drive ring for one-way driving engagement of the drive ring with the chaser plate and when in a neutral position permitting the pawls to remain in engagement with said teeth and hold the ring locked to the plate, and a detent member arranged to engage said cam member and releasably maintain the latter in a selected position.

WILLIAM O. THEWES.